United States Patent [19]

Brennan et al.

[11] Patent Number: 4,819,117
[45] Date of Patent: Apr. 4, 1989

[54] METHOD AND APPARATUS FOR DETECTING EXCESSIVE CURRENT DRAW IN AN ELECTRICAL LOAD

[75] Inventors: Daniel G. Brennan, Farmington Hills; Mark J. Gutwald, Rochester; Leonard J. Miller, Hartland, all of Mich.

[73] Assignee: TRW Inc., Lyndhurst, Ohio

[21] Appl. No.: 89,218

[22] Filed: Aug. 25, 1987

[51] Int. Cl.$^4$ .............................................. H02H 3/05
[52] U.S. Cl. ....................................... 361/18; 361/110; 361/58; 361/86; 361/89; 323/901; 323/908
[58] Field of Search ......................... 361/18, 29, 31, 45, 361/58, 87, 86, 101, 97, 94, 93, 111, 91, 92, 110; 323/351, 908, 277, 282, 901; 363/49, 50

[56] References Cited

U.S. PATENT DOCUMENTS

| | | | |
|---|---|---|---|
| 3,465,206 | 12/1966 | Harker et al. | 361/29 |
| 3,944,889 | 3/1976 | Conway | 361/89 |
| 3,970,901 | 7/1976 | Rohr | 361/87 |
| 4,220,900 | 9/1980 | Mintz | 318/266 |
| 4,432,031 | 2/1984 | Premerlani | 361/97 |
| 4,544,981 | 10/1985 | Hakoopian | 361/94 |
| 4,587,590 | 5/1986 | Bala et al. | 361/94 |
| 4,631,624 | 12/1986 | Dvorak et al. | 361/89 |

Primary Examiner—Todd E. Deboer
Attorney, Agent, or Firm—Tarolli, Sundheim & Covell

[57] ABSTRACT

A method and apparatus are disclosed for detecting excessive current draw in an electrical load particularly of the type having an in-rush current when first energized. The electrical load is connectable to an energy source through a current sensing circuit and an actuatable switch. The current sensing circuit provides a load sense signal that varies in response to current draw by the load. A control signal is provided to actuate the switch. A coupling network temporarily couples the control signal to the load sense signal to offset the change in the load sense signal resulting from current in-rush. The load sense signal is compared against a reference signal. The comparator outputs a signal indicative of whether the load sense signal is greater or less than the reference signal. One signal from the comparator is indicative of excessive current draw. The temporary coupling of the control signal with the load sense signal prevents the comparator from indicating an excessive current draw during current in-rush as long as the current draw does not reach a very large value, such as would occur during a short circuit. The output of the comparator is ANDed with the control signal for control of the switch.

19 Claims, 2 Drawing Sheets

METHOD AND APPARATUS FOR DETECTING EXCESSIVE CURRENT DRAW IN AN ELECTRICAL LOAD

TECHNICAL FIELD

The present invention relates to a method and apparatus for detecting excessive current draw in an electrical load. The invention is particularly directed to a method and apparatus for detecting excessive current draw in an electrical load of the type having a large, initial current draw when electrical power is first applied to the load.

BACKGROUND OF THE INVENTION

There are known devices for detecting excessive current draw in an electrical load. Typically, such detector devices sense the amount of current flowing through the electrical load. When the sensed current exceeds a predetermined value, an output signal indicative thereof is provided by the detector. The detector output signal is typically used to control a switching device. When the detector output signal is indicative of excessive current draw, the switching device disconnects the electrical load from the source of electrical energy.

One particular type of excessive current detecting device is a short circuit detector. Such detectors typically include means for sensing the amount of electrical current drawn by an electrical load. A predetermined test value is established which is slightly greater than the maximum expected value of current draw by the electrical load under normal, steady-state operating conditions. If the actual current draw by the load exceeds the predetermined test value, it is assumed that the electrical load is short circuited. The detector, upon detecting a short circuit, controls a switching device to disconnect the electrical load from the source of electrical energy.

Some electrical loads, such as lamps or electric motors, for example, initially draw a large amount current when a source of electrical energy is first applied thereto. Under normal operating conditions, the large, initial current drawn by the load subsequently decays to a steady-state, operating value. The large, initial current draw is known in the art as "in-rush current." A short circuit detector, upon sensing an in-rush current that exceeds its predetermined test value, would disconnect the electrical load from the energy source when, in fact, there was no true electrical short circuit in the electrical load.

To prevent a false indication of an electrical short circuit in a load having a high in-rush current, some electrical short circuit detectors have included time-delay circuits. Such time-delay circuits disable the short circuit detector for a predetermined period of time after initial application of electrical energy to the electrical load. The time period is sufficiently long to insure that, if the electrical load is operating normally, the current draw by the load will decay to its steady-state value before the period expires.

An example of an electrical short circuit detector having a time-delay circuit is disclosed in U.S. Pat. No. 3,465,206 to Harker et al. The Harker et al. '206 patent discloses a time-delay circuit breaker having a short circuit override. An electrical load is connected to a source of electrical energy through relays which are controlled by a relay drive circuit. The relay drive circuit is operatively connected to two silicon-controlled recitfiers (SCR's) which are connected in series. A current monitoring circuit is electrically connected to both SCR's and to lines connecting the relays to the load. The SCR's are arranged to trip when their gate voltages reach a predetermined level.

During an excess, steady-state current draw, the SCR's are tripped. When the SCR's are tripped, the relay drive circuit deactivates causing the relays to open thereby disconnecting the electrical load from the source of electrical energy. When the source of electrical energy is initially applied to the load, a time-delay circuit sufficiently delays actuation of the SCR's so as to prevent a false indication of an electrical short circuit. If a true electrical short circuit exists at the time of initial application of electrical energy, a signal is generated which bypasses the time-delay circuit and instantaneously trips the SCR's.

Another example of an electrical short circuit detector is disclosed in U.S. Pat. No. 4,544,981 to Hakoopian. The Hakoopian '981 patent discloses a short circuit protection/controller circuit for drivers and amplifiers. Current sensing resistors sense the current flowing through the positive and negative power supply input lines to the amplifier. Overload or short circuit conditions are detected by using comparators to compare the voltage drop across each current sensing resistor against a reference voltage. The amplifier is disconnected from the load when either current sensing resistor provides an electrical signal indicative of overload or short circuit conditions. A capacitor is used to suppress transient or noise currents which exceed the overload or short circuit current limit value.

SUMMARY OF THE INVENTION

The present invention is directed to a method and apparatus for detecting excessive current draw in an electrical load. The invention is particularly useful for monitoring electrical loads having a high current draw upon initial application of electrical energy to the electrical load.

In accordance with the present invention, an apparatus is provided for sensing excessive current in an electrical load. The apparatus comprises means for providing an actuating signal, and means for connecting the electrical load to a source of electrical energy in response to the actuating signal. The apparatus further includes means for providing a load sense signal having a value indicative of the value of electrical current through the load and means for temporarily coupling the actuating signal to the load sense signal to offset an initial change in the value of the load sense signal when the electrical load is first connected to the source of electrical energy. The apparatus further includes means for providing a reference signal having a predetermined value, and means for comparing the load sense signal against the reference signal and for generating a first signal when the reference signal is greater than the load sense signal and a second signal when the reference signal is less than the load sense signal, one of the signals generated by the comparing means being indicative of excessive current draw by the electrical load.

In accordance with another aspect of the present invention, a method is provided for sensing excessive current in an electrical load comprising the steps of providing an actuating signal, connecting the electrical load to a source of electrical energy in response to the actuating signal, providing a load sense signal having a value indicative of the value of electrical current through the load, temporarily coupling the actuating signal to the load sense signal to offset an initial change in the value of the load sense signal when the electric signal is first connected to the source of electrical energy, providing a reference signal having a predetermined value, and comparing the load sense signal against the reference signal and for generating a first signal when the reference signal is greater than the load sense signal and a second signal when the reference signal is less than the load sense signal, one of the signals generated by the comparing means being indicative of excessive current draw by the electrical load.

In accordance with a preferred embodiment, an electrical load is connectable to a source of electrical energy through an actuatable switching device and a sense resistor. The switching device is actuatable in response to an actuation signal. A voltage dividing network is connected to the junction of the sense resistor and the switching device. The voltage dividing network provides a load sense signal having a voltage that varies in accordance with the current draw by the electrical load. A comparator has its inverting input connected to a reference voltage and its noninverting input connected to the load sense signal.

A controller provides a first signal when it is desired to energize the load and a second signal when it is desired not to energize the load. The controller signal is coupled to the load sense signal through a resistor/capacitor series network. The load sense signal is adapted to remain more positive relative to the reference voltage when the electrical load is drawing a permissible amount of current thereby maintaining the comparator output in a first condition. As current draw by the electrical load increases, the load sense signal approaches the value of the reference signal. Once the current draw reaches a level which results in the load sense signal becoming negative relative to the reference signal, the comparator output switches to a second condition thereby indicating an excessive current draw.

An ANDing network ANDs the output of the comparator with the controller signal. When the controller provides a first signal and the comparator output is in a first condition, the actuating signal is provided to close the switching device. When the electrical energy is connected to the load, an in-rush of current occurs which could cause the comparator to switch to the second condition indicative of an excessive current draw. To prevent such an occurrence, the controller signal is added to the load sense signal to offset the initial change in the value across the sense resistor so as to maintain the value of the load signal greater than the reference signal.

If a true short circuit exists in the load, the coupled controller signal would not be sufficient in value to maintain the load sense signal more positive than the reference signal because of the large change in voltage across the series resistor. Once the load sense signal becomes less than the reference signal, the comparator switches. When the comparator switches, the actuation signal is removed, the switch de-actuated, and the load is disconnected from the source of electrical energy.

BRIEF DESCRIPTION OF THE DRAWINGS

Further features and advantages of the present invention will be apparent to those skilled in the art to which the present invention relates from the following detailed description of a preferred embodiment of the invention made with reference to the accompanying drawings, in which.

BEST MODE FOR CARRYING OUT THE INVENTION

Figure 1:
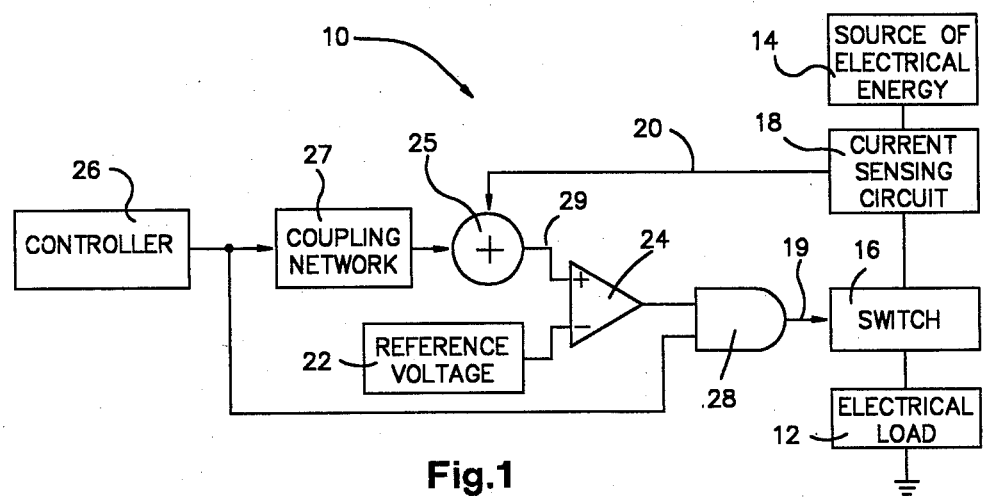
FIG. 1 is a schematic block diagram of an apparatus made in accordance with the present invention.

Referring to FIG. 1, an apparatus 10 is shown for detecting excessive current draw in an electrical load 12. The electrical load 12 is of the type (such as a lamp or motor) that draws a large, initial current when first connected to a source of electrical energy. The current draw subsequently drops to a steady-state, operating value.

The load 12 is connectable to a source of electrical energy 14 through an electrically actuatable switch 16 and a current sensing circuit 18 connected in series therebetween. The switch 16 is actuatable in response to an actuator signal 19. The sensing circuit 18 provides a load sense signal 20 having a value indicative of the amount of current flow to the load 12. The current sensing circuit 18, in the preferred embodiment, is adapted so that the value of the load sense signal 20 decreases relative to system ground as current increases through the electrical load 12.

A reference voltage 22 is connected to one input of a comparator 24. The load sense signal 20 is connected to a summing circuit 25 which, in turn, has its output 29 connected to the other input of the comparator 24.

A controller circuit 26 outputs and electric signal having a first condition when the load 12 is to be energized and a second condition when the load 12 is to be de-energized. In accordance with the preferred embodiment of the present invention,.the controller circuit 26 outputs a digital HIGH to energize the load 12 and a digital LOW to de-energize the load 12. The output of the controller circuit 26 is connected to the summing circuit 25 through a coupling network 27.

The coupling network 27 is adapted to temporarily pass the controller output signal to the summing circuit 25 when a transition occurs from a LOW to a HIGH. The summing circuit 25 is adapted to decay the passed controller signal to a pretransition value- within a predetermined time period. The effect of the passed controller signal is to temporarily increase the output 29 of the summing circuit 25 for a predetermined time period. The output signal 29 from the summing circuit 25 is referred to herein as the modified load sense signal.

The comparator 24 compares the modified load sense signal 29 with the reference voltage 22. The output of the comparator 24 is in a first state when the value of the modified load sense signal 29 is greater than the value of the reference voltage 22. The output of the comparator 24 is in a second state when the value of the modified load sense signal 29 is less than the value of the reference voltage 22. The comparator 24 is adapted so that a HIGH is outputted for the first state and a LOW is outputted for the second state. The output of the comparator 24 being in the second state is indicative of excessive current draw by the load 12.

The output of the comparator 24 is connected to one input of an AND circuit 28. The output of the controller circuit 26 is connected to another input of the AND circuit 28. When the output of the comparator 24 is in the first state (HIGH), and the controller circuit 26 output switches HIGH, the output of the AND circuit 28 is switched to a first state which is a HIGH. When the output signal from the comparator 24 is in the second state (LOW) and/or the output signal from the controller circuit 26 switches LOW, the output of the AND circuit 28 switches to a second state which is a LOW.

The output of the AND circuit 28 is the actuation signal 19 used to control actuation of the switch 16. When the output of the AND circuit 28 is in the first state (a digital HIGH), the switch 16 is actuated so that the load 12 is connected to the source 14 of electrical energy. When the output of the AND circuit 28 is in the second state (a digital LOW), the switch 16 is deactuated so that the load 12 is disconnected from the source 14 of electrical energy.

The current sensing circuit 18 and the output of the summing circuit 25 are adapted to maintain the value of the modified load sense signal 29 slightly greater than the value of the reference voltage 22 when the switch 16 is not actuated. When electrical energy is initially applied to the load 12 by actuating switch 16, an in-rush of current occurs through the load 12. The in-rush current causes the load sense signal 20 to decrease rapidly. The decrease in the load sense signal 20 results in a rapidly decreasing modified load sense signal 29.

Assume that the output signal from the controller circuit 26 was not coupled to the summing circuit 25. The modified load sense signal 29 would decrease to a value less than the reference voltage 24 during a normal, current in-rush. Under such conditions, the output of the comparator 24 would change from the first state (HIGH) to the second state (LOW) thereby switching the output of the AND circuit 28 from a HIGH to a LOW which, in turn, would result in the switch 16 being deactuated. The load 12 would thus be disconnected from the source 14 of electrical energy because of a normal current in-rush situation.

By temporarily passing the output signal from the controller circuit 26, the rapid change in load sense signal 20 is offset to an extent sufficient to maintain the modified load sense signal 29 greater than the reference voltage 22 during normal current in-rush through the electrical load 12. The output of the comparator 24 remains in the first state (HIGH) thereby maintaining the output of the AND circuit 28 HIGH which, in turn, keeps the switch 16 actuated.

A predetermined time after the source of electrical energy 14 is first connected to the load 12, the current flow through the load 12 decays to a steady-state operating current. If a true short circuit condition occurs in the load 12 after the current has reached its steady-state operating value, the load sense signal 20 would decrease which, in turn, would decrease the modified load sense signal 29 to a value less than the reference voltage 22 The output of the comparator 24 would change from the first state (HIGH) to the second state (LOW), thereby causing the output of AND circuit 28 to go LOW and de-actuated switch 16.

The circuitry of the present invention is adapted to detect excessive current draw by the load 12 when electrical energy is initially connected to the load 12. If a short circuit condition is present in the load 12 when electrical energy is initially applied, then the decrease in the load sense signal 20 is substantially greater than the offset provided by the passed output signal from the controller circuit 26. The modified load sense signal 29 drops to a value less than the value of the reference voltage 22. The output of the comparator 24 changes from the first state (HIGH) to the second state (LOW) causing the output of AND circuit 28 to go LOW and de-actuate the switch 16. The detection of a true short circuit condition in the load 12 is thereby provided during the initial application of electrical energy to the load 12.

Figure 2:
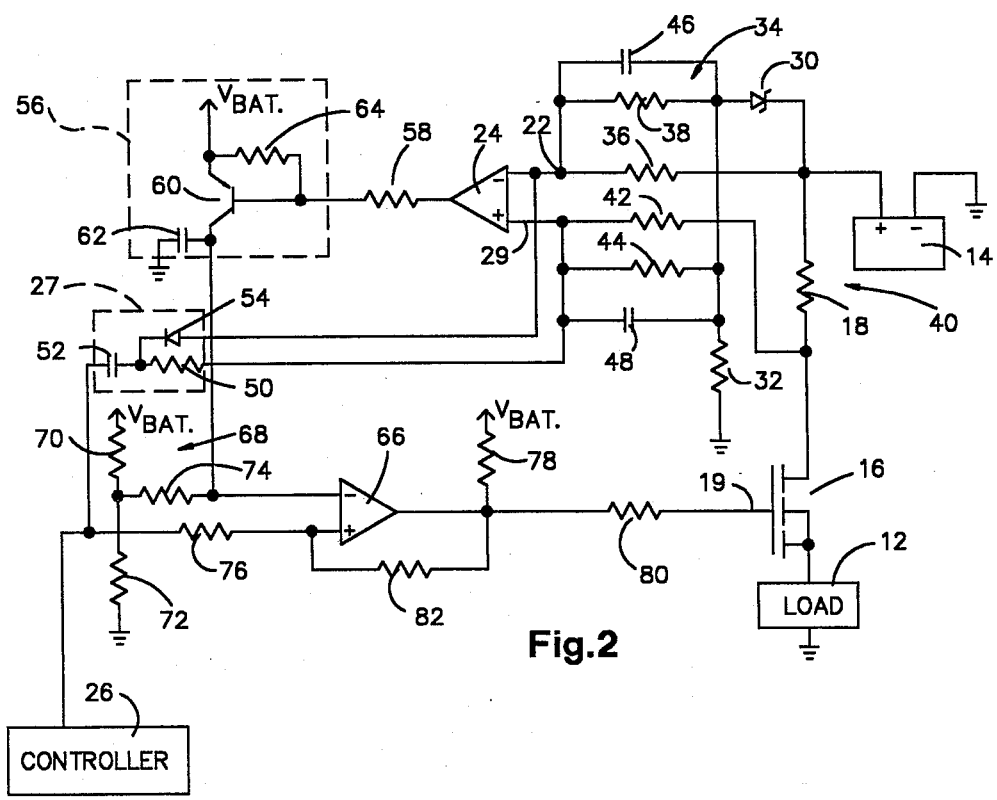
FIG. 2 is a schematic circuit diagram of a preferred embodiment of the present invention.

Referring to FIG. 2, a preferred embodiment of the present invention is shown. The load 12, such as an indicator lamp, is connected to a source of electrical energy 14 through the current sensing circuit 18 and solid state switch 16 such as a field effect transistor ("FET"). The source 14 of electrical energy is a vehicle battery. The current sensing circuit 18 is a resistor which converts the current flow to the lamp 12 into a voltage signal relative to ground. The FET switch 16 is responsive to the actuation signal 19.

Figure 2A:
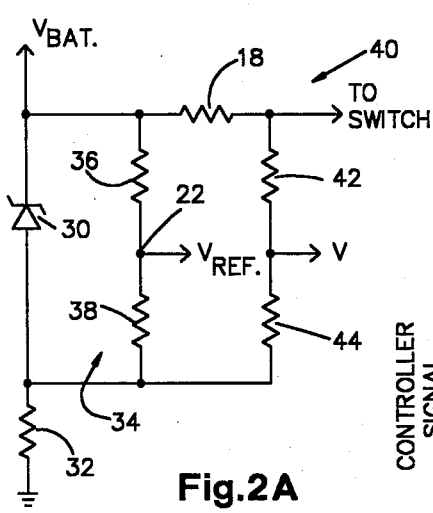
FIG. 2A is a schematic circuit diagram showing a portion of the embodiment of FIG. 2.

The current sensing circuit 18 and reference voltage 22 are also shown in FIG. 2A. A Zener diode 30 and a resistor 32 are connected in series across the vehicle battery 14. A first resistor network 34 is connected across the Zener diode 30. The first resistor network 34 includes resistors 36, 38 connected in series. Resistors 36, 38 form a first voltage dividing network wherein the junction of resistors 36, 38 provide the reference voltage 22 which is connected to the inverting input of comparator 24. A second resistor network 40 includes the current sense resistor 18 along with resistors 42, 44 connected in series across the Zener diode 30. Resistors 18, 42, 44 form a second voltage dividing network wherein the junction of resistors 42, 44 is connected to the noninverting input of comparator 24. It should be appreciated that the resistors 18, 42, 44 form part of the summing circuit 25 shown in FIG. 1. The voltage present at the junction of resistors 42, 44 varies inversely relative to the current draw through the load 12. Capacitors 46, 48 (FIG. 2) are respectively connected across resistors 38, 44 and are provided for noise suppression.

The values of resistors 36, 38, 42, 44, and 18 are selected so that the voltage at the noninverting input of comparator 24 is slightly greater than the voltage at the inverting input when switch 16 is de-actuated. The output of comparator 24 under such condition is equal to its positive supply potential (HIGH). When switch 16 is actuated and current draw by the load 12 increases, the voltage drop across the sensing resistor 18 increases which lowers the voltage value at the noninverting input of comparator 24. At a predetermined, steady-state current draw by the load, the noninverting input voltage is less than the voltage value at the inverting input. When this occurs, the output of the comparator 24 switches to ground potential (LOW).

The output of the controller circuit 26 is coupled to the junction of resistors 42, 44 through the coupling network 27. The coupling network 27 includes a resistor 50 and a capacitor 52 connected in series between the junction of resistors 42, 44 and the output of circuit 26. A diode 54 has its cathode connected to the junction between the resistor 50 and the capacitor 52. The anode of the diode 54 is connected to the junction of resistors 36, 38 which is the reference voltage 22.

When the output of the control circuit 26 is first switched LOW, the capacitor 52 is quickly charged through diode 54 to a value equal to the reference voltage 22 minus the voltage drop across the diode 54. The capacitor 52 is further charged through resistor 50 to a value equal to the steady-state voltage at the junction of resistors 42, 44. When the output of the controller circuit 26 is switched HIGH, for the purpose of energizing the load 12, a voltage is "passed through" the capacitor 52 and is summed with the voltage existing at the junction of resistors 42, 44. As should be appreciated, the decreasing voltage at the junction of the sensing resistor 18 and the switch 16 reduces the steady-state voltage value at the junction of resistors 42, 44 while the voltage signal passed through capacitor 52 increases the steady-state voltage value. The summation of the voltage signals results in the modified load sense signal 29 which is connected to the noninverting input of comparator 24.

The output of comparator 24 is connected to a time-delay network 56 through a current limiting resistor 58. The time-delay network 56 includes a transistor 60, a capacitor 62, and a pull-up resistor 64. The base of transistor 60 is connected to the output of comparator 24 through the limiting resistor 58, and is connected to the battery 14 through the pull-up resistor 64. The emitter of transistor 60 is connected to the battery 14. The capacitor 62 is connected to the collector of transistor 60 and is connected to ground. When the output of the comparator 24 is in the first state, i.e., the modified load sense signal 29 is greater than the reference voltage, the transistor 60 is turned OFF. When the output of the comparator 24 is in the second state, i.e., the modified load sense signal 29 is less than the reference voltage 22, the transistor 60 is turned ON.

The junction of the collector of transistor 60 and the capacitor 62 is connected to an inverting input of a comparator 66 and to a biasing network 68. The biasing network 68 includes resistors 70, 72 connected in series between the battery 14 and electrical ground. A resistor 74 connects the junction between resistors 70, 72 to the inverting input of the comparator 66.

The output of the controller circuit 26 is connected to the noninverting input of the comparator 66 through a resistor 76. The output of comparator 66 is connected to the battery 14 through a pull-up resistor 78 and is connected to the gate of switch 16 through a current limiting resistor 80. The output of comparator 66 is also connected to its noninverting input through resistor 82 so as to provide circuit hysteresis.

The values of resistors 70, 72 of network 68 are selected so that the inverting input of comparator 66 is biased to a voltage value between the HIGH and LOW voltage levels of the output signal of the controller circuit 26 when the transistor 60 is OFF. For example, if the controller circuit 26 outputs 0 volts DC for a LOW signal and 5 volts DC for a HIGH signal, the value of resistors 70, 72 could be selected so as to provide 3.5 volts DC to the inverting input of comparator 66.

When it is desired to initially have the load 12 not energized, the controller circuit 26 outputs a LOW signal. The LOW signal (0 volts DC) at the noninverting input of comparator 66 is less than the voltage (3.5 volts DC) at the inverting input. The output of the comparator 66 is at ground potential which retains the switch 16 de-actuated. When switch 16 is de-actuated, only a steady-state bias current flows through sense resistor 18. As mentioned above, the values of the bias resistors 36, 38, and 18, 42, 44 are selected so that the voltage value present at the noninverting input of comparator 24 is slightly greater than the value of the reference voltage 22 when switch 16 is de-actuated. The output of the comparator 24 is HIGH which maintains transistor 60 OFF. The capacitor 62 is charged to a voltage value established by the resistors 70, 72.

Figure 3:
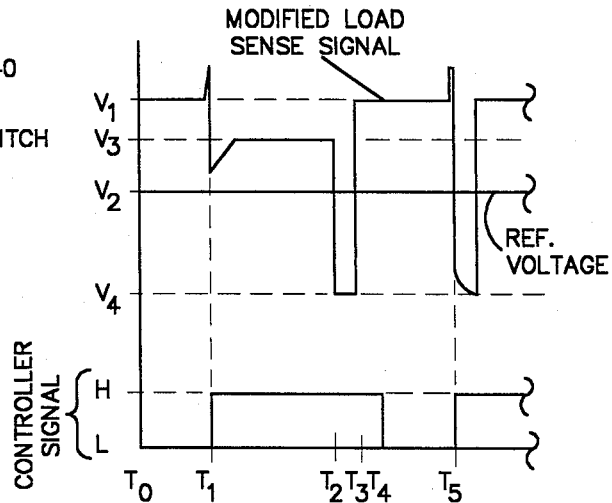
FIG. 3 is a graphical illustration of operating voltage levels at certain connecting locations of the circuit shown in FIG. 2.

Referring to FIG. 3, the operation of the circuit shown in FIG. 2 will be better appreciated. A graph illustrates voltage values at various connection locations within the circuit shown in FIG. 2. At time $T_0$, the controller output signal is at a LOW. The output of comparator 66 is at ground potential since the voltage at the noninverting input is less than the voltage at the inverting input. Thus, the switch 16 is maintained OFF (de-actuated) and no current flows through the load 12. The modified load sense signal 29 is at a voltage level $V_1$ which is greater than the reference voltage 22 which is at $V_2$.

At time $T_1$, the controller signal is switched to a HIGH for the purpose of energizing the load 12. When the controller signal switches HIGH, the modified load sense signal voltage 29 is increased by the signal passed through capacitor 52 and resistor 50. The controller signal 26 results in the noninverting input of comparator 66 becoming more positive than the inverting input, thereby causing the output of comparator 66 to switch to its positive supply voltage. The output signal from the comparator 66 actuates switch 16 ON. When the switch 16 connects the load 12 to the battery 14, a current in-rush causes the voltage at the junction between resistor 18 and switch 16 to rapidly decrease relative to ground. The rapidly decreasing voltage subtracts from the voltage value present at the junction of resistors 42, 44. As time progresses, the current in-rush decays and capacitor 52 discharges through resistors 50, 44, 32. The modified load sense signal 29 settles to a steady-state voltage value $V_3$ which is indicative of the steady-state current draw by the load 12.

If at some time during the energization of the load, such as a time $T_2$, the load should become electrically shorted, the modified load sense signal 29 would drop to a voltage value established by a path through resistor 36, diode 54, resistor 50, and resistor 42 to the load 12 which would be at a voltage level $V_4$. Since $V_4$ would be less than the reference voltage $V_2$, the output of the comparator 24 would be switched to its ground potential, thereby turning ON the transistor 60 which, in turn, results in the inverting input of comparator 66 being more positive than the noninverting input resulting in the output of the comparator 66 switching to its ground potential. This de-actuates the switch 16 which disconnects the load 12 from the battery 14.

Once the switch 16 is de-actuated, the modified load sense signal 29 returns to the voltage level $V_1$ thereby resulting in the output of comparator 24 switching to the positive supply potential since the modified load sense signal 29 at the noninverting input is more positive than the reference voltage present at the inverting input. Transistor 60 is turned OFF which, in turn, switches the output of comparator 66 to the positive supply potential and again actuates the switch 16.

Capacitor 62 provides a predetermined time delay between the determination of a short circuit or excessive current draw at time $T_2$ and the de-actuation of the switch 16 at time $T_3$. This time delay ($T_3 - T_2$) is sufficient to retain a thermal heat generated by the switch 16 below that which could damage the switching device itself. The circuit arrangement also provides for automatic re-actuation of the switching device so that the circuit is always attempting to energize the load 12 as long as the controller signal remains at a digital HIGH.

Assume that at time $T_4$ the controller signal is switched LOW and at $T_5$ the controller signal is again switched HIGH to energize the lamp 12. Also assume that an electrical short exists at time $T_5$ in the load 12. The modified load sense signal 29 increases temporarily as a result of the controller signal passed through capacitor 52 and resistor 50. Because a true short circuit exists in the load 12, the voltage value at the junction between resistor 18 and switch 16 drops to substantially ground potential. This results in the modified load sense signal 29 dropping to a value below the reference voltage 22. The passed controller signal is not sufficient to overcome the large voltage value change at the junction of resistor 18 and switch 16. After a time delay resulting from the resistor 58 and capacitor 62, the switch 16 is de-actuated and the modified load sense signal 29 returns to a voltage value $V_1$ which, in turn, causes the switch 16 to again be actuated.

The output signal from the controller 26 being able to pass through capacitor 52 and resistor 50 depends on the capacitor 52 being charged. When the controller signal is switched LOW, the capacitor 52 is discharged. So that the load 12 can be periodically actuated at a given frequency, the capacitor 52 must be able to be charged within a portion of the signal period. The diode 54 provides this rapid changing ability. When the controller signal switches LOW, the capacitor 52 is rapidly charged through resistor 36 and diode 54 to a value of the reference voltage 22 minus the voltage drop across the diode 54.

Figure 4:
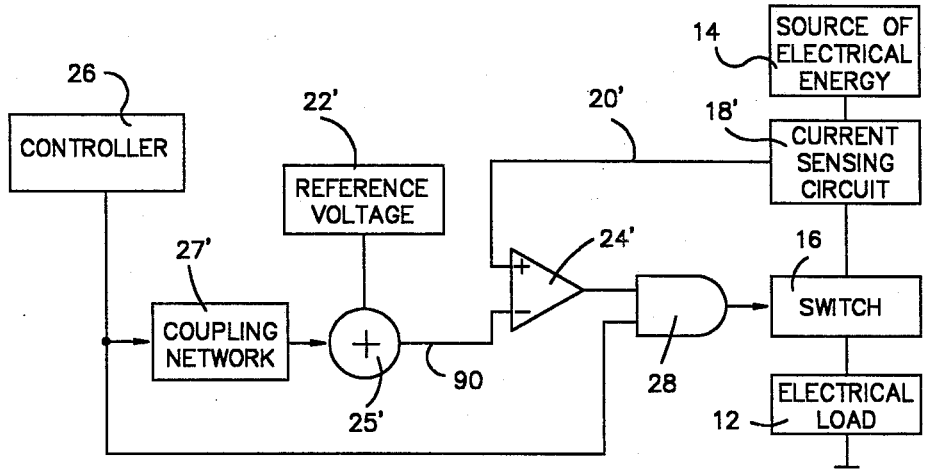
FIG. 4 is a schematic block diagram of an apparatus made in accordance with another embodiment of the present invention.

In its broadest aspect, the present invention temporarily modifies the value of the threshold voltage against which a voltage value indicative of current draw by the load is compared. Referring to FIG. 4, a threshold value 90 has two components, a steady-state value and a modified value. The steady state value is derived from a reference voltage signal 22'. The reference voltage 22' is modified by the signal from the controller 26 through a coupling network 27' in a similar manner as described above. The current sensing circuit 18' outputs a signal having a value indicative of current draw through the load 12. As current draw increases, the value of the output signal from circuit 18' increases. The output of current sensing circuit 18' is connected to the inverting input of comparator 24'. The threshold value 90 is connected to the non-inverting input of comparator 24'. During steady-state operation, the voltage value from circuit 18', which is indicative of current draw by the load, is compared against the steady-state value established by the reference voltage 22'. If the voltage value indicative of current draw exceeds the steady-state value, a signal indicative of excessive current draw is provided by comparator 24' which de-actuates switch 16 in a similar manner as described above. When the load is first energized, the threshold value 90 is temporarily increased to account for current in-rush. If a short circuit exists in the load at the time of initial energization, the voltage value outputted from circuit 18' would exceed the increased threshold value and result in de-actuation of switch 16.

This invention has been described with reference to preferred embodiments. Modifications and alterations may occur to others upon reading and understanding this specification. It is our intention to include all such modifications and alterations insofar as they come within the scope of the appended claims or their equivalent thereof.

Having described a preferred embodiment of the invention, the following is claimed:

1. An apparatus for sensing excessive current in an electrical load comprising:
    means for providing an actuating signal;
    means for connecting or disconnecting the electrical load to a source of electrical energy in response to said actuating signal;
    means providing a load sense signal at a terminal, said load sense signal having a value indicative of the value of electrical current through the load;
    means for modifying said load sense signal in response to said actuating signal to offset an initial change in the value of said load sense signal when the electrical load is first connected to the source of electrical energy, said means for modifying includes means for temporarily coupling said actuating signal to said load sense signal at said terminal;
    means for providing a reference signal having a predetermined value; and
    means for comparing the modified load sense signal against said reference signal and for generating a first signal when the reference signal is greater than the modified load sense signal and a second signal when the reference signal is less than the modified load sense signal, one of the signals generated by the comparing means being indicative of excessive current draw by the electrical load.

2. The apparatus of claim 1 wherein said means providing a load sense signal includes a sensing resistor connected in series with the electrical load and said means for connecting between the source of electrical energy, a voltage dividing network connected to the sensing resistor, the voltage provided by the voltage dividing network being the load sense signal.

3. The apparatus of claim 2 wherein the means for temporarily coupling said actuating signal to said load sense signal is a resistor and capacitor connected in series between the means for providing the actuating signal and the voltage dividing network.

4. The apparatus of claim 3 wherein the means for temporarily coupling said actuating signal further includes means for discharging said capacitor after said actuating signal is provided.

5. An apparatus for sensing excessive current in an electrical load comprising:
    means for providing an actuating signal, said actuating signal being changeable from a first condition to a second condition;
    switch means for connecting or disconnecting the electrical load to a source of electrical energy when said actuating signal changes to said second condition;
    sensing means sensing electrical current through the load and for providing a load sense signal at a terminal with said load sense signal having a value indicative of the sensed current, said load sense signal having one value when electrical energy is first connected to the load due to current in-rush and a second steady-state value when the electrical energy has been connected to the load for a predetermined time period;

means for temporarily coupling said actuating signal to said load sense signal at said terminal when the electrical energy is first connected to the load to offset an initial change in the value of said load sense signal due to the current in-rush;

means for providing a reference signal having a predetermined value; and means for comparing said load sense signal against said reference signal and for generating a first signal when the reference signal is greater than the load sense signal and a second signal when the reference signal is less than the load sense signal with one of the signals generated by the comparing means being indicative of excessive current draw by the electrical load.

6. The apparatus of claim 5 wherein said means for providing a load sense signal includes a sensing resistor connected in series between the source of electrical energy and the electrical load and a voltage dividing network connected to the junction of the sensing resistor and the electrical load, the voltage provided by the voltage dividing network being the load sense signal.

7. The apparatus of claim 6 wherein the means for temporarily coupling said actuating signal to said load sense signal is a resistor and capacitor connected in series between the means for providing the actuating signal and the voltage dividing network.

8. The apparatus of claim 7 wherein the means for temporarily coupling said actuating signal further includes means for discharging said capacitor after said actuating signal is provided.

9. An apparatus for sensing excessive current draw in an electrical load comprising:

actuatable switch means for connecting or disconnecting the electrical load to a source of electrical energy in response to an actuation signal;

sense resistor connected in series with the electrical load, said sense resistor developing a voltage thereacross having a value indicative of the, current being drawn by the electrical load;

means connected to said, sense resistor providing a load sense signal at a terminal which is responsive to the voltage developed across said sense resistor;

means for providing a control signal having a first condition when it is desirable to have the electrical load not energized and a second condition when it is desired to energize the electrical load;

means for momentarily coupling said control signal to said load sense signal at said terminal to offset an initial change in the voltage value developed across said sense resistor when electrical energy is first connected to the electrical load;

means for providing a reference signal having a predetermined voltage value;

means for comparing said load sense signal against said reference signal and for generating a first signal when the reference signal is greater than the load sense signal and a second signal when the reference signal is less than the load sense signal with one of the signals generated by said comparing means being indicative of excessive current draw by the electrical load; and means for ANDING said control signal with the generated signal from said comparing means and for providing the actuation signal when the control signal is in its second condition and the comparing means is generating a signal indicative to no excessive current draw by the electrical load.

10. The apparatus of claim 9 wherein said means for providing a reference signal is a voltage dividing network connected across the source of electrical energy.

11. The apparatus of claim 9 wherein the means providing the load sense signal is a voltage dividing network connected to a junction of the sense resistor and the electrical load.

12. The apparatus of claim 11 wherein said means for temporarily coupling said control signal to said load sense signal is a resistor and capacitor connected in series between said control signal and said load sense signal.

13. The apparatus of claim 12 further including means to charge said capacitor to a predetermined potential prior to said control signal switching from the first condition to the second condition.

14. The apparatus of claim 13 including means to discharge said capacitor after the control signal switches from the first condition to the second condition.

15. The apparatus of claim 9 further including time delay means for delaying the comparator output signal from effecting switching of the ANDing means for a predetermined time period.

16. An apparatus for sensing excessive current draw in an electrical load comprising:

means providing an electrical signal having a value indicative of the amount of electrical current through the electrical load;

means for providing a variable threshold signal at a terminal, said threshold signal having a value indicative of the maximum current permitted to be drawn by the electrical load;

means for comparing the value of said signal indicative of the amount of electrical current through the electrical load against said variable threshold signal and for providing a signal indicative of the electrical current drawn by the electrical load exceeding the maximum permitted current to be drawn as established by the variable theshold signal; and means for varying the value of said threshold signal at said terminal for a predetermined time period when electrical energy is first applied to the electrical load, the maximum allowable current permitted to be drawn by the load varying with the varying threshold value.

17. A method for sensing excessive current in an electrical load comprising:

providing an actuating signal;

connecting the electrical load to a source of electrical energy in response to said actuating signal;

providing a load sense signal at a terminal, said load sense signal having a value indicative of the value of electrical through the load;

modifying said load sense signal in response to said actuating signal to offset an initial change in the value of said sense signal by temporarily coupling the actuating signal to said load sense signal at said terminal;

providing a reference signal having a predetermined value; and comparing the modified load sense signal against the reference signal and for generating a first signal when the reference signal is greater than the modified load sense signal and a second signal when the reference signal is less than the modified load sense signal, one of the signals generated by the comparing means being indicative of excessive current draw by the electrical load.

18. A method for sensing excessive current in an electrical load comprising:

providing an actuating signal, said actuating signal being changeable from a first condition to a second condition;

connecting the electrical load to a source of electrical energy when said actuating signal changes to said second condition;

sensing electrical current through the load;

providing a load sense signal at a terminal having a value indicative of the sensed current, said load sense signal having one value when electrical energy is first connected to the load due to current in-rush and a second steady-state value when the electrical energy has been connected to the load for a predetermined time period;

coupling said actuating signal to said load sense signal at said terminal when the electrical energy is first connected to the load to offset an initial change in the value of said load sense signal due to the current in-rush;

providing a reference signal having a predetermined value; and comparing said load sense signal against the reference signal and for generating a first signal when the reference signal is greater than the load sense signal and a second signal when the reference signal is less than the load sense signal, one of the signals generated in the comparing means being indicative of excessive current draw by the electrical load.

19. A method for sensing excessive current draw in an electrical load comprising:

providing an electrical signal having a value indicative of the amount of electrical current through the electrical load;

providing a variable threshold signal at a terminal, said variable threshold signal having a value indicative of the maximum current draw permitted to flow through the electrical load;

comparing the value of said signal indicative of the amount of electrical current through the electrical load against said variable threshold signal;

providing a signal indicative of the electrical current through the load exceeding the maximum permitted value established by the variable threshold signal; and varying the value of said threshold signal at said terminal for a predetermined time period when electrical energy is first applied to the electrical load, the maximum allowable current permitted to flow through the load varying with the varying threshold value.

* * * * *

UNITED STATES PATENT AND TRADEMARK OFFICE
CERTIFICATE OF CORRECTION

PATENT NO. : 4,819,117

DATED : April 4, 1989

INVENTOR(S) : Daniel G. Brennan, Mark J. Gutwald, Leonard J. Mille

It is certified that error appears in the above-identified patent and that said Letters Patent is hereby corrected as shown below:

Claim 9, Column 11, Line 41: the comma should be omitted after the word "said".

Claim 9, Column 11, Line 39: the comma should be omitted after the word "the".

Claim 14, Column 12, Line 17: the word "further" should be added after the words "claim 13".

Claim 15, Column 12, Line 23: the word "comparator" should be omitted and should be replaced with the words "comparing means".

Claim 17, Column 12, Line 55: the word "current" should be inserted after the word "electrical".

Claim 18, Column 14, Line 3: the word "means" should be omitted and should be replaced by the word "step".

Signed and Sealed this

Fifth Day of December, 1989

*Attest:*

JEFFREY M. SAMUELS

*Attesting Officer*     *Acting Commissioner of Patents and Trademarks*